United States Patent [19]

Jacobson

[11] Patent Number: 4,807,345

[45] Date of Patent: Feb. 28, 1989

[54] MANUALLY OPERATED CLIP ATTACHMENT APPARATUS

[75] Inventor: Gordon R. Jacobson, Mayville, N.Y.

[73] Assignee: Delaware Capital Formation, Inc., Bloomington, Del.

[21] Appl. No.: 83,519

[22] Filed: Aug. 7, 1987

[51] Int. Cl.$^{4}$ .............................................. B23P 19/04

[52] U.S. Cl. .................................. 29/243.56; 72/452; 29/267; 53/138 A

[58] Field of Search ......................... 72/410, 409, 452; 53/138 A, 138 R; 29/243.57, 243.56, 267; 81/128; 227/129, 15

[56] References Cited

U.S. PATENT DOCUMENTS

| | | | |
|---|---|---|---|
| 1,845,389 | 2/1932 | Baash et al. | 81/128 |
| 2,114,983 | 4/1938 | Levin | 227/15 |
| 3,210,835 | 10/1965 | Tipper | 29/243.57 |
| 3,224,083 | 12/1965 | Tipper | 29/243.57 |
| 3,327,514 | 6/1967 | Tipper | 29/243.57 |
| 4,182,015 | 1/1980 | Niedecker | 29/243.56 |
| 4,312,108 | 1/1982 | Tipper | 53/138 A |

FOREIGN PATENT DOCUMENTS

| | | | |
|---|---|---|---|
| 1284350 | 11/1968 | Fed. Rep. of Germany | 53/138 A |
| 2725359 | 12/1978 | Fed. Rep. of Germany | 53/138 A |

*Primary Examiner*—Daniel C. Crane

*Attorney, Agent, or Firm*—Allegretti & Witcoff, Ltd.

[57] ABSTRACT

A manually operated clip attachment apparatus or clipper has a generally planar main body plate which includes a longitudinal punch guide and clip channel. The lower end of the channel supports a die. A window is provided in the side of the channel for receipt of a clip. An open throat above the lower end of the channel and die is provided for placement of the deformable or flexible casing or bag material and thus defines a throat opening. A punch moves longitudinal in the clip channel to engage a single clip and move it along the channel about the gathered material and into contact with the die. A manual lever arm is pivotally attached to the main plate at one end. The opposite end includes a handle for operation of the lever arm. Intermediate the pivot end and the handle is a bearing surface which engages a follower cam attached to the punch. The lever arm is biased to a punch disengage position. A special clip magazine is affixed to the main plate and includes a channel for directing clips singly through the window into the clip channel.

5 Claims, 3 Drawing Sheets

Fig. 3
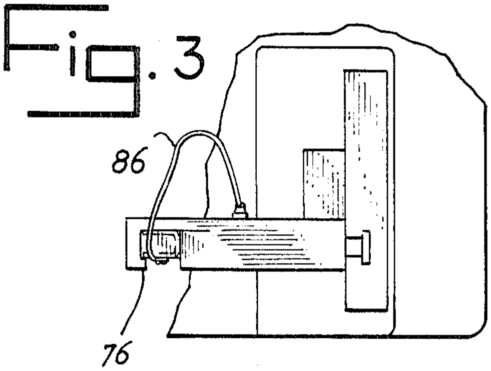
Fig. 5
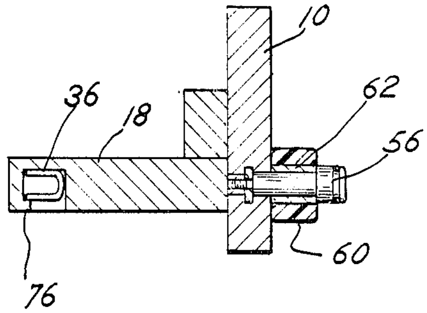
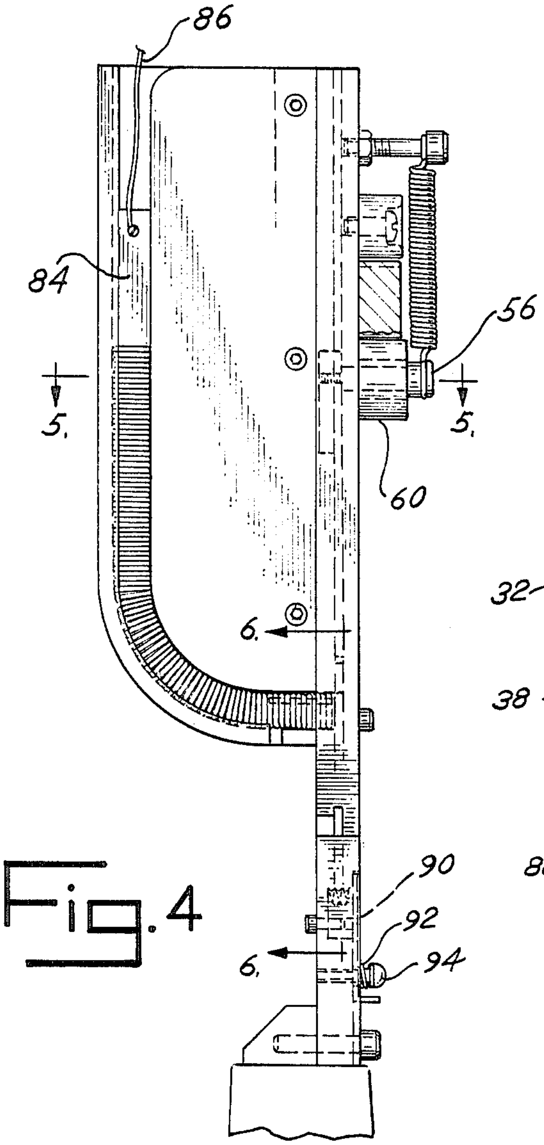
Fig. 4
Fig. 6
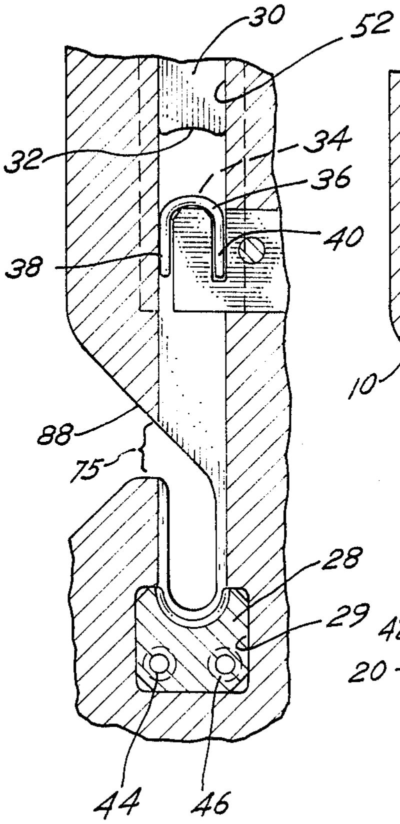
Fig. 7
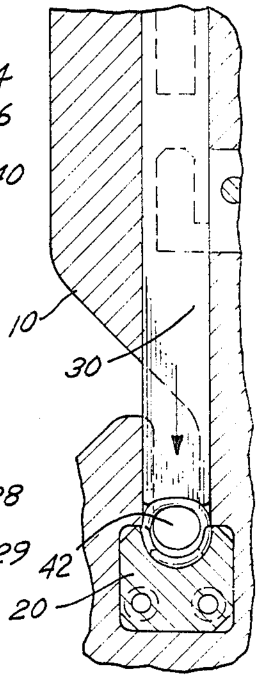

MANUALLY OPERATED CLIP ATTACHMENT APPARATUS

BACKGROUND OF THE INVENTION

This invention relates to an apparatus for applying a permanent fastener, such as a U-shaped metal clip, about an article. The apparatus is particularly adapted for applying a metal clip or staple about the end of a flexible, deformable casing or bag enclosing a product such as a food stuff.

Heretofore application of metal fasteners of the type described could be achieved using a portable, manually operated apparatus such as depicted in Tipper U.S. Pat. No. 3,224,083 and Tipper U.S. Pat. No. 3,327,514. These prior patents disclose that a U-shaped metal clip may be fed through a slot into a channel where the clip is engaged by a punch and driven through the channel toward a die. The legs of the U-shaped metal clip are deformed about previously compacted flexible material against the die. The apparatus typically includes a manually operated lever arm or handle which engages and drives the punch in the manner described.

Buchy, in Pat. No. 2,748,389, discloses a stapler or clipper for a sausage package which is operated by a foot peddle that drives a punch into engagement with a U-shaped metal clip positioned in a channel.

While the aforementioned references disclose manually or foot operated clippers which are useful, there has remained the need for a simplified, less expensive, and highly reliable clipper or clip attachment apparatus for attaching U-shaped metal clips about flexible or deformable casing or bag material which encloses various products. This desire motivated the development of the present invention particularly the simplified construction of the mechanical drive linkage which engages and drives the clip punch.

SUMMARY OF THE INVENTION

In a principal aspect the present invention comprises a manually operated clip attachment apparatus or clipper having a generally planar main body plate which includes a longitudinal punch guide and chip channel. The lower end of the channel supports a die. A window is provided in the side of the channel for receipt of a clip. An open throat above the lower end of the channel and die permits placement of deformable or flexible casing or bag material against the die. A manual lever arm is pivotally attached at one end to the main plate. The opposite end includes a handle for operation of the lever arm. Intermediate the pivot end and the handle is a bearing surface which engages a follower cam attached to a clip punch in the channel. The lever arm is biased toward a punch disengage position. Manual pivoting of the arm against the biasing force drives the punch longitudinally in the clip channel to engage a single clip and move it along the channel about the gathered material and then into contact with the die. In this manner the clip is deformed about the gathered material. A special clip magazine is affixed to the main plate and includes a magazine channel for directing clips singly through the window into the clip channel for engagement by the punch.

Thus, it is an object of the invention to provide an improved and simplified manually operated clipper or clip attachment apparatus.

Yet another object of the invention is to provide a manually operated clip attachment apparatus which utilizes a pivotal lever arm having a handle at one end and a pivot point at its opposite end with an intermediate cam drive surface for engaging and driving a roller and attached punch against a U-shaped metal clip in a clip channel.

Yet a further object of the invention is to provide an improved manually operated clipper having the fewest number of parts.

Yet another object of the invention is to provide a manually operated clipper which is operated by pulling on a manual lever arm in the direction of punch travel and thus in the direction of movement of the clip during attachment.

Yet another object of the present invention is to provide a manually operated clipper which provides a maximum amount of mechanical advantage and thus clip driving force and clip forming force in a compact and simplified mechanism.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 3 is a top plan view of the clip magazine of the invention;

FIG. 4 is a front elevation of the punch mechanism and clip magazine of the invention;

FIG. 5 is a cross sectional view taken substantially along the line 5—5 in FIG. 4;

FIG. 6 is a cross sectional view taken substantially along the line 6—6 in FIG. 4;

FIG. 7 is a cross sectional view similar to FIG. 6 wherein the punch has engaged a clip and deformed it in cooperation with a die;

DESCRIPTION OF THE PREFERRED EMBODIMENT

Figure 1:
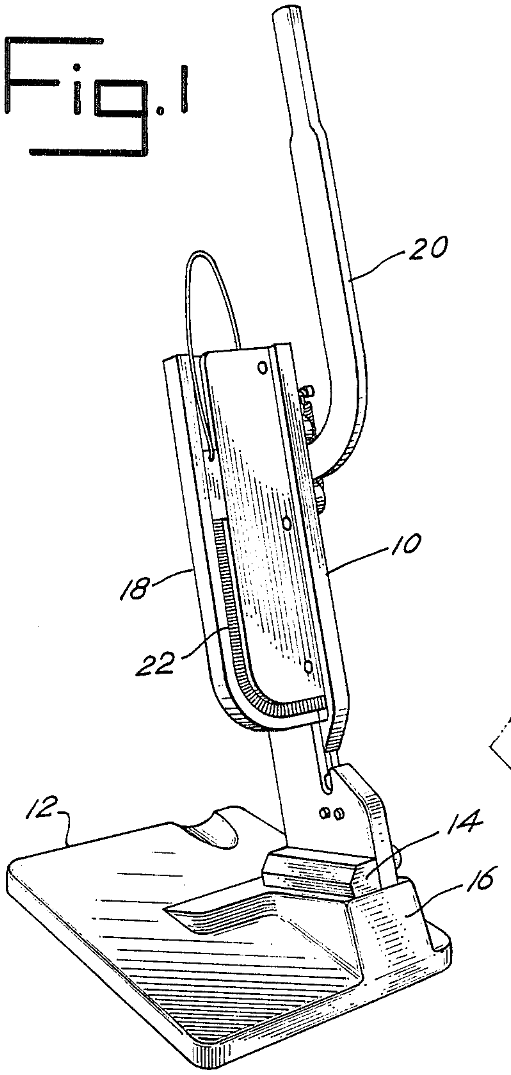
FIG. 1 is a perspective view of the improved manually operated clipper of the present invention.

In the figures, like numbers refer to like parts. FIG. 1 is a perspective view illustrating the improved manually operated clipper. Generally, the clipper includes a main body plate 10 mounted on a generally horizontal mounting plate 12 by means of a mounting block 14. The mounting plate 12 includes a platform 16 having an angled mounting surface for cooperation with the block 14 and the plate 10. The plate 10 is a generally planar, unitary plate, typically an aluminum alloy plate, which is machined to define various slots and pivot openings. Thus, in order to manufacture the plate, flat aluminum stock can be easily utilized.

A clip magazine 18 is bolted to the plate 10. Magazine 18 is made from the same stock material as plate 10 and extends transversely from plate 10. U-shaped metal clips 22 are guided through a channel 22 in the magazine plate 18 into a clip channel 24 defined in the plate 10 where they are engaged by a punch 30 driven by a pivotal, lever arm 20.

Figure 2:
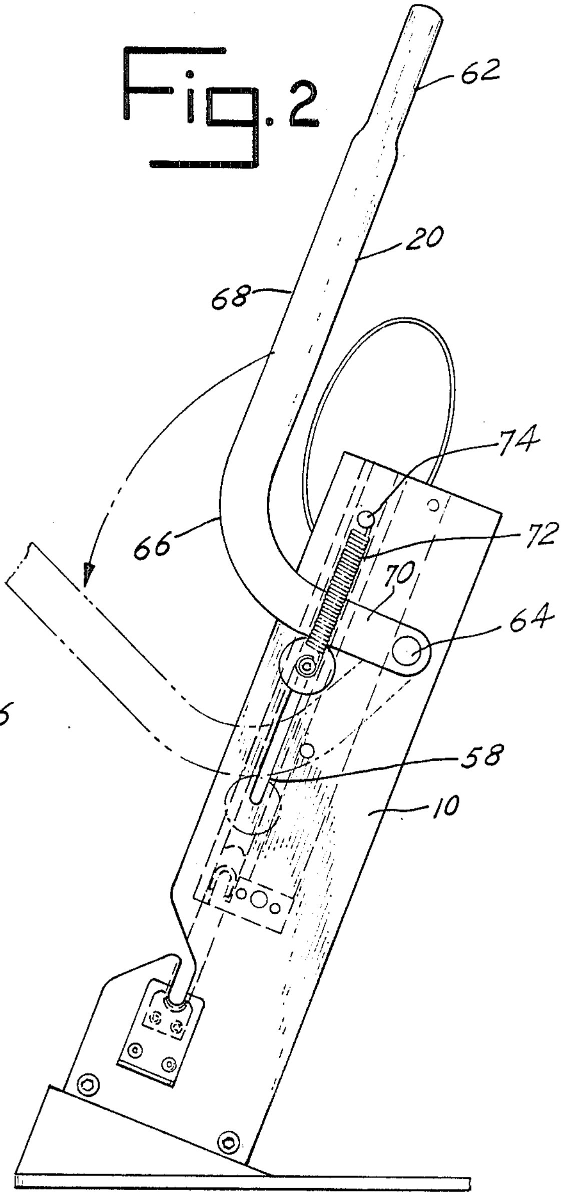
FIG. 2 is a side elevation of the clipper of FIG. 1 illustrating the manual lever arm in the punch retracted as well as the punch engaged positions.

More specifically, referring to FIG. 2 as well as the remaining figures, the plate 10 is a rectangular parallelepiped. It extends upwardly from the platform 16 to which it is attached by means of the block 14 in a generally vertical direction so that the plate 10 is rigidly supported by the platform plate 12. The plate 10 includes a generally vertical clip channel 24 in FIG. 8, for example, which extends vertically from the top edge 26 of the plate 10 downward to a die support opening which supports a die 28 at the lower end of the channel 24. The cross sectional shape of the channel 24 is rectangular and is adapted to receive a rectangular cross section punch 30. The punch 30 slidably rides in the channel 24. The punch 30 is an elongated member having a lower or engaging surface or side 32 which is curved to engage a crown 34 of a clip 36 as depicted in FIG. 6 and FIG. 7.

The clip 36 also includes parallel legs 38 and 40 which are spaced from one another by the crown 34 a distance substantially equal to the width of the channel 24. In this manner the punch 30 can easily drive the clip 36 downward through the channel 24 for ultimate engagement with die 28 positioned at the bottom end of the channel 24.

The die 28 is a typical clip engaging die which includes two parallel curved die channels each channel designed to engage a separate leg 38 and 40 of clip 36 and direct that leg 38, 40 in a curved path about flexible or deformable material 42 as shown in FIG. 7. Note that the die 28 fits into a die slot or window 29 as shown in FIG. 6 thereby permitting replacement, repair and substitution of the die 28. This results since the die 28 is maintained in position by fasteners 44 and 46.

Figure 8:
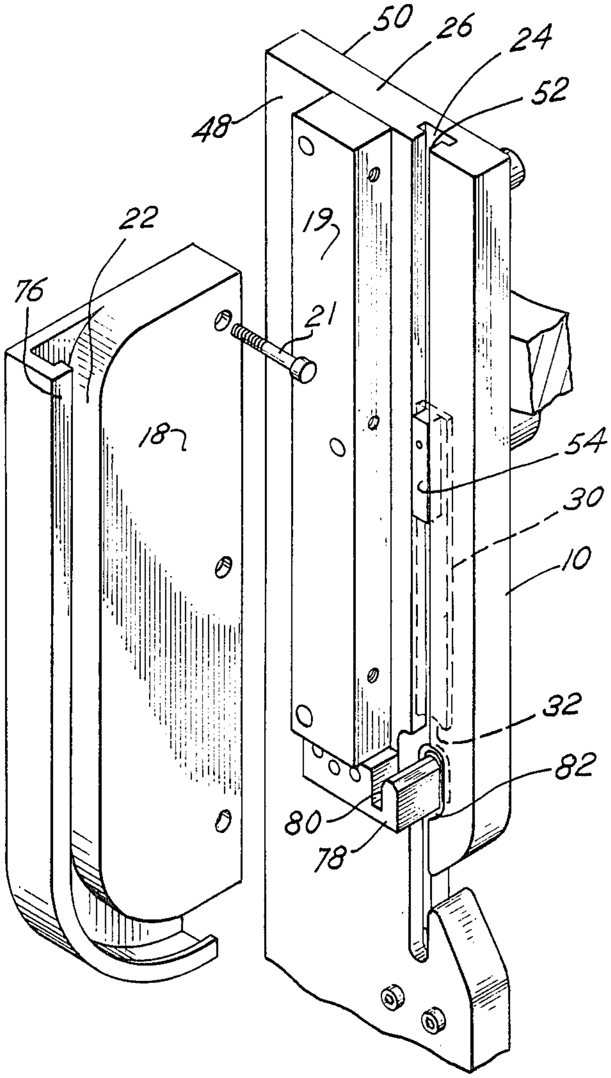
FIG. 8 is an exploded perspective view of the clip magazine and main body plate of the clipper of the invention.
Figure 9:
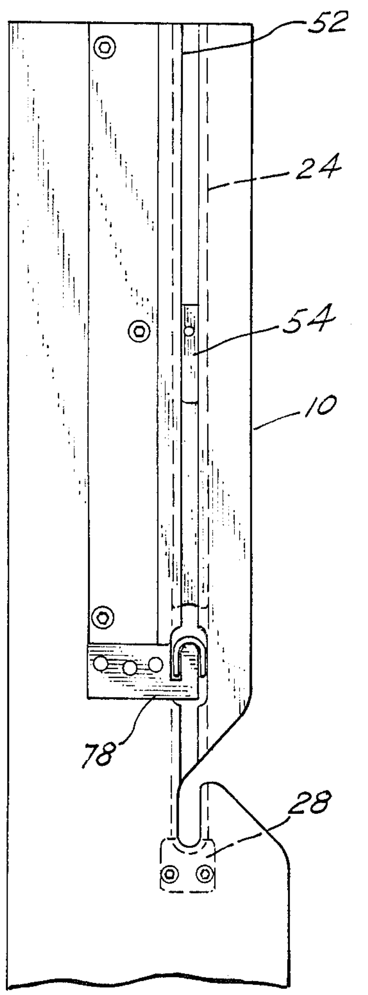
FIG. 9 is a side elevation of the body plate depicted in FIG. 8.

The channel 24 is defined on the interior of the plate 10. Access to the channel 24 is provided on both major length sides thereof. That is, the channel 24 has major length sides generally parallel to the major dimension sides 48 and 50 of the plate 10 as shown in FIG. 8. A longitudinal slot 52 having a lateral dimension less than that of the channel 24 is defined through the side or surface 48 of the plate 10; namely, through the surface 48 of the plate 10 to the channel 24. Importantly, the dimension of the width of the slot 52 is less than the width of the channel 24 to ensure that the legs 38 and 40 of the clip 36 will be retained in the channel 24 and will not slip from the channel 24. Additionally this ensures that the punch 30 will be retained within the channel 24. The slot 52 extends the total length of the channel 24. A guide block 54 is positioned within the channel 52. The guide block 54 is attached to the punch 30 by means of a fastener 56 as shown in FIGS. 4 and 5. The fastener 56 also connects a follower roller to the opposite side of the punch 30 as will be described below. Thus, on the opposite side 50 of the plate 10, a foreshortened slot 58 as shown in FIG. 2 extends through the plate 10 to the channel 24. The slot 58 receives the pin or fastener 56 which is sized to ride in the slot and thus defines the limit of travel of the pin 56 in the slot 58. Since the pin 56 is attached to the punch 30, the limit of travel of pin 56 defines the limit of travel of the punch 30 in the channel 24. Again note that the transverse dimension or width of the slot 58 is less than that of the channel 24 in order that the punch 30 will be retained within the channel 24.

A follower 60, which is a roller, is attached or supported by the pin 56. The follower 60 is affixed to the pin 56 by means of a bearing 62 so that the follower 60 can roll freely with respect to the axis or axle defined by the pin 56.

Lever arm 20 includes a manual handle 62 at one end and a pivot connection defined by a pivot pin 64 at its opposite end. The arm 20 is generally L-shaped with a smooth curved cam surface 66 connecting runs 68 and 70 of the lever arm 20. By grasping the handle 62, then it is possible to pivot the lever arm 20 about the axis of pin 64 thereby engaging the cam surface 66 against the surface of the follower roller 60. This imparts force against punch 30 riding in channel 24 driving the punch 30 between the punch retracted position illustrated in FIG. 2 and the punch extended position illustrated in FIG. 2 in phantom and also in FIG. 7.

The pin 56 is connected by a spring 72 to the plate 10 and more particularly to a support pin 74 attached to the plate 10. Thus, the punch 30 is always biased toward the retracted position. Further, by this arrangement, the roller 60 is biased into engagement with the cam surface 66. As shown in FIG. 2 then, the lever 20 moves between the upright or punch retracted position to the punch engagement position by moving against the force of the spring 72.

As the punch 30 travels in the channel 24 it is initially positioned above a clip 36 positioned in the channel 24 as shown in FIG. 6. As the punch 30 moves downward in the channel 24 it engages the crown 34 of the clip 36 and drives the clip 36 along the channel 24 to the position shown in FIG. 7.

Though a single clip 36 is retained in the channel 24 and directed therein from the magazine channel 22, a series of clips 36 are typically provided in channel 22. Clips 36 are joined together in a stack by a flexible tape at the crown 36, for example. In this manner a single clip 36 will project into the channel 25 from the stack or assembly of clips 36 retained in the magazine channel 22.

The magazine channel 22 is a generally rectangular channel having a front slot defined by a flange 76 as shown in FIG. 3. The clips 36 are arranged with the crown 34 facing toward the main plate 10 and the legs 38, 40 extending outwardly as also shown in FIG. 3. The adjacent crowns 34 of the clips 36 are, as previously mentioned, interconnected for example by a piece of flexible tape. Thus, the clips 36 move together in unison down the clip channel 22.

At the end of the clip channel 22 adjacent the punch channel 24, a clip support bar 78 as shown in FIG. 8 is supported below the magazine 18. The clip support bar 78 is sized to receive and support the clips 36 on their crown 34 as depicted in FIG. 6. The bar 78 thus includes a longitudinal channel 80 for receipt of a leg 40 as shown in FIG. 6. The clips 36 move over the support bar 78 through a clip window 82 which is as wide as the clip 36. In other words, window 82 is sized to permit passage of a clip 36 therethrough into the channel 24.

A weight comprising a rectangular plug 84 as shown in FIG. 5 is slidably received in the top end of the clip channel 22 and impinges against the stack of clips 36 to force the clips 36 downward in the channel 22 over the block 78 and into position for engagement by punch 30. In practice, the block 84 is retained by a cable or wire 86 which attaches from the block 84 to the magazine plate 18 as depicted in FIG. 3.

The plate 10 includes a throat opening 88 into which casing or deformable material 42 may be positioned manually. The throat opening 88 extends downwardly to a position above the die 28. The width of the throat opening 88 adjacent the die block 28 is less than the width of the spacing of the legs 38 and 40 of the clip 36. This enables the clip 36 to pass easily about the deformable material 42 retained within the throat opening 88. The opening 88 also intersects the slot of channel 24 by a length dimension 75 in FIG. 6. Dimension 75 is less than the height of a clip 36 from the bottom of leg 38 to crown 34. This is necessary in order to prevent clip 36 from falling out of channel 24.

Positioned over the die block 28 along one side thereof is a biased gathering plate 90 having a slot dimensionally equal to size to the throat opening 88 above the die block 28. The plate 90 is held in position by a spring 92 supported on pins or studs 94 extending into the plate 10. In this manner, after the deformable material 42 is clipped by operation of the clipper, the deformable material 42 may be easily removed from the throat opening 88 by movement of plate 90 against the biasing force of spring 92. The plate 90, in other words, will tilt out of the way.

Among the various important features of the invention is the use of a single plate 18 having a single continuous magazine channel or slot 22 defining a channel 22 for the clips 36 which are fed into the punch channel 24. The magazine plate 18 thus is easily attached to a support block 19 fastened to the main plate 10 by means of fasteners 21. The use of such a single plate 18 greatly enhances the ease and ability to manufacture a clip slot 22 which easily accommodates clips 36 and does not require alignment of various channel components.

Also, the use of a guide block 78 in combination with the magazine plate 18 provides an easy and simplified manner for guiding clips one at a time into the channel 24.

The use of a single lever arm 20 achieves a mechanical advantage associated with the distance between the pivot point 64 and roller 60 relative to the total length of a fulcrum arm between the pivot point 64 and the handle 62. This machanical advantage is achieved without the use of intricate interconnected gears, springs and other mechanical leverage devices. Thus, the simplicity of the product greatly enhances its ease of operation. In addition, this provides for a product which is more easily disassembled for cleaning, repair and the like. Consequently, though there has been set forth a preferred embodiment of the present invention, it is to be understood that the invention is to be limited only by the following claims and their equivalents.

What is claimed is:

1. An improved manually operated clipper of the type for attaching U-shaped metal clips about gathered material comprising, in combination:

(a) a generally planar main body plate having generally opposed, spaced side surfaces and including a longitudinal punch guide and clip channel in the plate, said channel having a lower end for receipt of a clip die, said channel having a connected, parallel slot through one side of the plate, a clip window in the opposite side of the plate, an open throat above the lower end of the channel and die, the dimension of the throat opening being less than the length of a leg of a clip for the clipper;

(b) a punch slidably mounted in the channel;

(c) a manual lever arm having a manual handle, said arm pivotally attached to the main plate at the end opposite the handle to pivot about an axis transverse to the direction of the channel, said lever arm including a cam surface and mounted on the same side surface of the plate as the parallel slot;

(d) bearing means mounted on the outside surface of the plate for cooperative engagement with the lever arm cam surface;

(e) attachment means having a length extending parallel with said axis and connecting the bearing means to the punch and extending through and riding in the slot and attached to the punch, said bearing means cooperatively engaged with the cam surface of the arm, said bearing means engaging the arm intermediate the handle and the fulcrum pivot for translating the punch in the channel toward the die in response to pivoting action of the lever arm in one direction, said slot engageable with the attachment means of the bearing means to the punch to limit the travel of the punch in the channel in at least one direction;

(f) biasing means for biasing the punch in a retracted position away from the die; and (g) a unitary clip magazine attached to the main plate on the side defining the clip window, said magazine defining a channel for directing clips one at a time through the window into the clip channel.

2. The clipper of claim 1 wherein the clip magazine comprises a single plate having a channel open at the opposite ends thereof for receipt of clips at one end and discharge at the opposite end, said channel being generally rectangular and sized to receive clips transverse to the direction of clip movement in the channel, said magazine also including a clip guide block mounted in the clip window for guiding clips singly into the clip channel when the punch is in the retracted position.

3. The clipper of claim 1 including a stop member attached to the main plate for limiting pivotal movement of the arm in the retracted position.

4. The improvement of claim 1 wherein the bearing means includes a follower roller and the lever arm cam surface engages the follower roller.

5. The improvement of claim 4 wherein the cam surface is a programmed surface which precisely limits and controls the travel of the punch in the channel toward the die.

* * * * *